(12) United States Patent
Lee et al.

(10) Patent No.: US 7,541,932 B2
(45) Date of Patent: Jun. 2, 2009

(54) PASSIVE UHF OMNIDIRECTIONAL CONTAINER ELECTRONIC SEAL

(75) Inventors: Chin-Tsung Lee, Shanghai (CN); Yung-Ning Chao, Shanghai (CN)

(73) Assignee: United Fiber Optic Communication, Hsinchu (TW)

( * ) Notice: Subject to any disclaimer, the term of this patent is extended or adjusted under 35 U.S.C. 154(b) by 385 days.

(21) Appl. No.: 11/606,070

(22) Filed: Nov. 30, 2006

(65) Prior Publication Data

US 2007/0194025 A1 Aug. 23, 2007

(30) Foreign Application Priority Data

Feb. 21, 2006 (CN) ................ 2006 2 0039634 U

(51) Int. Cl.
*G08B 13/14* (2006.01)
(52) U.S. Cl. .............. 340/572.8; 340/572.7; 340/572.9; 340/568.2; 340/687; 340/686.4
(58) Field of Classification Search ... 340/572.7–572.9, 340/568.2, 686.1, 687, 686.4, 545.2
See application file for complete search history.

(56) References Cited

U.S. PATENT DOCUMENTS

2007/0103310 A1* 5/2007 Hopman et al. .......... 340/572.8

* cited by examiner

*Primary Examiner*—Benjamin C Lee
*Assistant Examiner*—Hongmin Fan
(74) *Attorney, Agent, or Firm*—Muncy, Geissler, Olds & Lowe, PLLC

(57) ABSTRACT

The present invention discloses a passive UHF omnidirectional container electronic seal. It comprises a locking bar and a locking cap; the locking bar contains a locking bar hasing a RFID chip and a cable connector, wherein the RFID chip is electrically connected with the cable connector; and the locking cap hasing a plug-in unit, which is matched with the cable connector in the locking bar for connecting an antenna in the locking cap. The present invention combines the mechanical container seal in the present market with the RFID technology and adopts the ultra-high frequency (UHF) RFID technology, which has overcome numerous shortcomings to reach the long-distance transmission, the transmission distance can be up to 10 meters and with no direction, can resist more than 1.2 tons pulling force, and the appearance is novel, small, exquisite and cheap. In addition, the passive UHF omnidirectional container electronic seal of the present invention is one time use only without maintaining, which can provide the high efficiency and steady automation service on the container clearing customs and transportation management.

20 Claims, 4 Drawing Sheets

PASSIVE UHF OMNIDIRECTIONAL CONTAINER ELECTRONIC SEAL

BACKGROUND OF THE INVENTION

1. Field of the Invention

The present invention generally relates to a container seal, and more particularly to a passive UHF omnidirectional container electronic seal.

2. Description of the Related Art

It generally adopts a mechanical container seal, a bar code seal, or an active RFID electronic container seal in the present container transportation market. Although the price of the mechanical container seal is inexpensive, it is not capable of clearing customs automatically. Opposite, the active electronic container seal is capable of offering container transportation automatically, but the cost is too expensive, the appearance is relatively big, needs to utilize battery electricity to be transmitted, and difficult to retrieve. In addition, the RFID electronic container seal of the high frequency (HF 13.56 MHZ) can't realize the long-distance transmission and has the stronger directional characteristic generally.

Therefore, the above ways for sealing the container not only increase the operation cost of enterprise, but also realize the real automation of the container clearing customs difficultly. To overcome the aforementioned problems, there is needed a new container electronic seal to overcome the disadvantage of the art. Thus, in the present invention, a novel container electronic seal is proposed.

SUMMARY OF THE INVENTION

It is an objective of the present invention to provide a passive UHF omnidirectional container electronic seal, which combines the mechanical container seal in the present market with the newest RFID technology. It adopts the ultra-high frequency (UHF) RFID technology, and has overcome numerous shortcomings to reach the long-distance transmission, the transmission distance can be up to 10 meters and with no direction, can resist more than 1.2 tons pulling force, and the appearance is novel, small, exquisite and cheap. In addition, the passive UHF omnidirectional container electronic seal of the present invention is one time use only without maintaining, which can provide the high efficiency and steady automation service on the container clearing customs and transportation management.

To achieve the above objectives, the present invention provides a passive UHF omnidirectional container electronic seal, which comprises a locking bar and a locking cap. The locking bar has a RFID chip and a plug-in unit, wherein the RFID chip is electrically connected with the cable plug-in unit. The locking cap has a plug-in unit, which is matched with the cable plug-in unit in the locking bar for connecting an antenna in the locking cap.

When the locking bar inserts into the locking cap, the cable plug-in unit of the locking bar will touch the plug-in unit of the locking cap, which makes the RFID chip in the locking bar to connect with the plug-in unit of the locking cap through the cable plug-in unit of the locking bar for forming return circuit with antenna. This process keeps working in order to both write and read into the outside reader.

For reaching to the omnidirectional completely, the antenna is a spiral shape to prevent directional problem from reading and to enhance the sending and receiving capability of antenna.

The passive UHF omnidirectional container electronic seal of the present invention, the locking bar may further comprise an impedance matching device arranged between the RFID chip and the cable plug-in unit for reaching the best impedance matching value both between the RFID chip with the antenna and the RFID chip with the cable plug-in unit. The function of the impedance matching device is to make the RFID chip, antenna and cable plug-in unit can be reached the best impedance matching value among the three of them, and strengthen the performance of data transmission, such as the transmit distance.

The passive UHF omnidirectional container electronic seal of the present invention, the RFID chip is electrically connected with the cable plug-in unit through an electrical cable.

The present invention also can do some improvement as follows:

In one embodiment of the present invention, the locking bar is a metal spatial component, the RFID chip, cable plug-in unit, impedance matching device and electrical cable, which is arranged between the RFID chip and cable plug-in unit are inlaid in the cavity of the metal spatial component.

In another embodiment, the locking bar may contain a metal pipe fitting and a head of locking bar, which is located outside of the metal pipe fitting. The cable plug-in unit is inlaid in the bottom of the metal pipe fitting and the RFID chip is inlaid in the hand of locking bar. The electrical cable crossed through the metal pipe fitting to electrically connect with the RFID chip and the cable plug-in unit.

The locking bar uses the metal spatial component or the metal pipe fitting, not only can firm the pole body but also can send and receive from the inside and external electromagnetic wave signal with shielding. This function can ensure that the passive UHF omnidirectional container electronic seal will not be read before lock on or other external factors, such as because of the reaction by human.

The head of locking bar which is wrapped up the rubber or plastic out of the metal pipe fitting, such as the ABS material. In order to prevent the plastic head of the locking bar pulled out the metal pipe fitting under an action of strong force, such as opening the lock, the head of locking bar located in the top of metal pipe fitting may further comprise a trumpet-shaped metal cone and wrapped up the rubber and plastic out of the metal pipe fitting, such as the ABS material. So that, the metal pipe fitting is combined with the head of locking bar closely to guarantee the fastness between the metal pipe fitting and the head of locking bar.

Equally, for sending and receiving from the inside and external electromagnetic wave signal with shielding, the locking cap is also a metal spatial component, which is matched with the locking bar. The plug-in unit, matched with the cable plug-in unit, is inlaid in the cavity of the metal spatial component, and the antenna, connected with the plug-in unit, stretches out of the locking cap.

For cooperating with the metal pipe fitting of the locking bar mentioned above, the locking cap including a metal sheath matched with the metal pipe fitting of the locking bar and a plastic component covered outside of the metal sheath, The plug-in unit matched with the cable plug-in unit in the locking bar is inlaid in the metal sheath, and the antenna stretches out of the plastic component.

In order to protect the antenna, there is a covered antenna cap outside with the plastic component.

To make sure the locking bar and locking cap can combine closely and difficult to be pulled out after lock on, there is a pair of grooves in the outside of the metal spatial component or the metal pipe fitting of locking bar and a spring lock in the metal spatial component or the metal sheath of locking cap. When the locking bar inserts into the locking cap, the spring lock can be locked in the pair of grooves, outside the metal spatial component or the metal pipe fitting of locking bar. In the embodiment of the present invention, the pulling force between the locking cap and locking bar can reach 1.2 tons at least.

The metal locking cap is designed as a ladder-shaped and the metal pipe fitting is designed as a trumpet-shaped to ensure the metal locking cap would not be pulled out by violence. The designs can make the metal locking cap and the metal pipe fitting combine closely, and can bear stronger pulling force.

In another embodiment of the passive UHF omnidirectional container electronic seal of the present invention, there is a sealed loop in the locking cap, the sealed loop may densely seal up the space between the locking bar and the locking cap for guaranteeing, water will not flow into the locking cap and the locking bar in the humid condition or rainy day, To prevent the user inserts the metal pipe fitting of the locking bar into the metal sheath of the locking cap by mistake before locking the container, there is a detachable locking bar sheath disposed outside the bottom of the metal pipe fitting of the locking bar.

Because of adopting the above-mentioned technological schemes, the passive UHF omnidirectional container electronic seal of the present has overcome the difficulty of long-distance transmission in using ultra-high frequency UHF. In addition, it has a stronger resistance to the external force and a non-directional character. And it is simple and convenient to install, the appearance is small and exquisite, one time use only and non-maintaining issue. The present invention can provide the high efficiency and steady automatic security service on the container clearing customs and transportation management.

BRIEF DESCRIPTION OF THE DRAWINGS

These and other features, aspects, and advantages of the present invention will be more fully understood by reading the following detailed description of the preferred embodiment, with reference made to the accompanying drawings as follows:

FIG. 3 is a schematic diagram of the present invention before and after locking in.

DETAILED DESCRIPTION OF THE PREFERRED EMBODIMENT

Now combine some better execution examples for further explaining the passive container electronic seal of the present invention.

Figure 1:
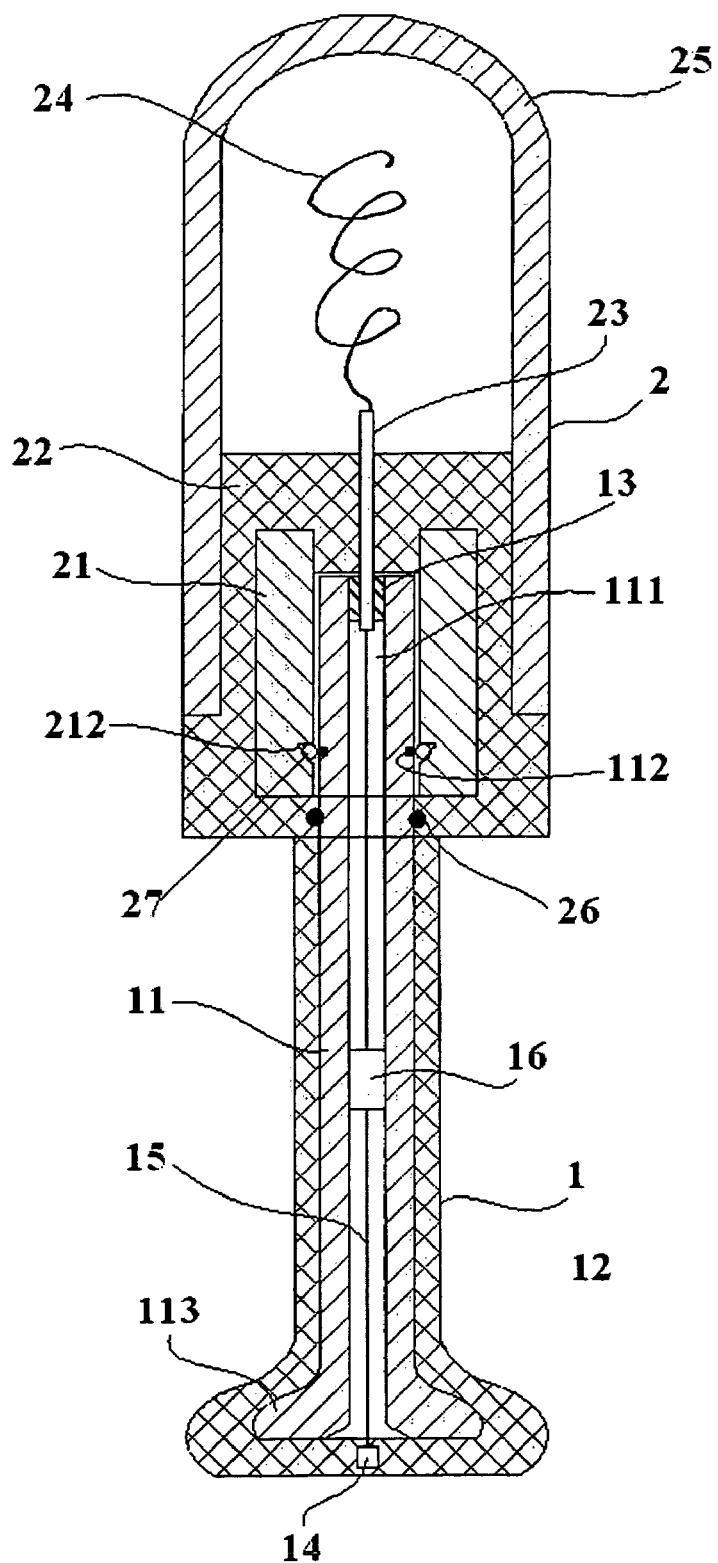
FIG. 1 is a schematic diagram of the passive UHF omnidirectional container electronic seal according to one embodiment of the present invention.

FIG. 1 illustrates a passive UHF omnidirectional container electronic seal according to one embodiment of the present invention. The Passive UHF omnidirectional container electronic seal contains a locking bar (1) and a locking cap (2). The locking bar (1) contains a metal pipe fitting (11) and a head of locking bar (12), which is located in the outside of the metal pipe fitting. A cable plug-in unit (13) inlays in the bottom of pipe cavity (111) of metal pipe fitting (11), and a RFID chip (14) inlays in the head of locking bar (12). The RFID chip (14) electrically connects with a cable plug-in unit (13) through a cable (15) and an impedance matching device (16). The cable (15) passes through the pipe cavity (111) of the metal pipe fitting (11), and the impedance matching device (16) is located in the pipe cavity (111) of the metal pipe fitting (11).

There is a pair of grooves (112) in the outside of the metal pipe fitting (11) and a metal cone (113) locates in the top of metal pipe fitting (11) to expand the head of locking bar (12) formed a trumpet-shaped. The head of locking bar (12) is wrapped up the rubber and plastic out of the metal pipe fitting (11), such as the ABS material. So that, the metal pipe fitting (11) is combined with the head of locking bar (12) closely to guarantee the fastness between the metal pipe fitting and the head of locking bar.

The locking cap (2) including a metal sheath (21) matched with the metal pipe fitting (11) and a plastic component (22) covered outside of the metal sheath (21). A plug-in unit (23) matched with the cable plug-in unit (13) in the locking bar (1), is inlaid in the bottom of the metal sheath (21). A spiral antenna (24) is soldered in the plug-in unit (23) and stretches out outside of the plastic component (22).

In order to protect the antenna (24), there is a covered antenna cap (25) outside with the plastic component (22) and the plastic is the ABS material.

There is a spring lock (27) in the metal sheath (21) of locking cap (2) and a sealed loop (26) in the plastic component (22) of locking cap (2), the sealed loop (26) may densely seal up the space between the metal pipe fitting (11) of locking bar (1) and the locking cap (2) to prevent water flow into the locking cap (2) and the locking bar (1).

When the metal pipe fitting (11) of locking bar (1) inserts into the metal sheath (21) of locking cap (2), the cable plug-in unit (13) in the metal pipe fitting (11) of locking bar (2) will touch the plug-in unit (23) in the metal sheath (21) of locking cap (2), that makes RFID chip (14) in the locking bar (1) to connect with the cable plug-in unit (13) of locking cap (2), through the cable (15) and the impedance matching device (16) connects to the plug-in unit (15), for forming return circuit with the plug-in unit (23) and antenna (24). This process keeps working in order to both write and read into the outside reader (please refer to FIG. 2). Because the stated cable plug-in unit (13) is located in the pipe cavity (111) of metal pipe fitting (11) can avoid users touching the cable plug-in unit (13) involuntary and makes a wrong response of the RFID chip (14) by human reaction.

At the same time, there is a pair of grooves (212) in the metal sheath (21) of locking cap (2) and a spring lock (27) in the pair of groove (212). When the metal pipe fitting (11) of locking bar (1) inserts into the metal sheath (21) of locking cap (2), the spring lock (27) can be locked into the pair of grooves (212), outside the metal spatial component (11) of locking bar (1). Pulling force between the locking cap (2) and locking bar (1) can reach 1.2 tons at least.

Figure 2:
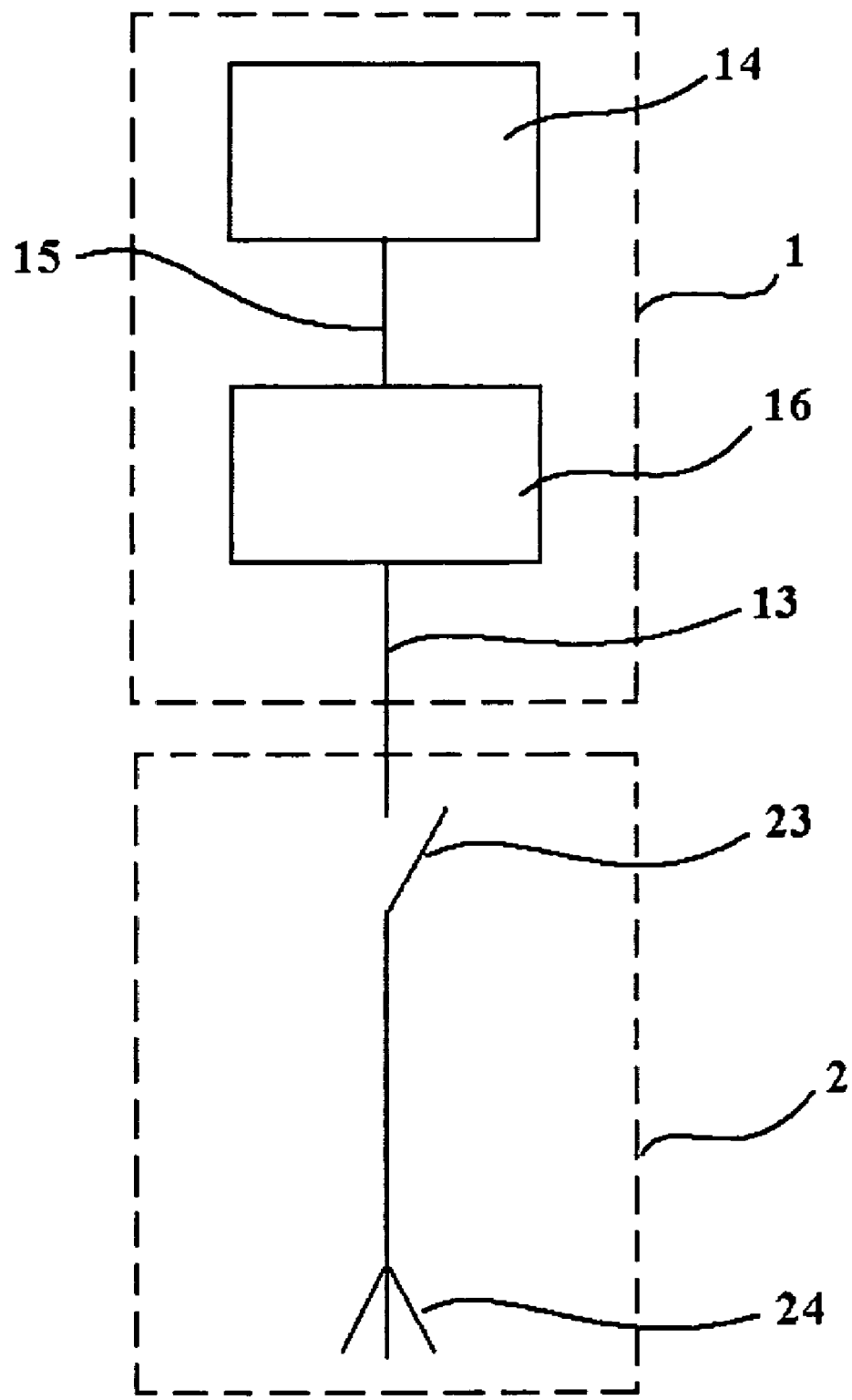
FIG. 2 is the principle diagram of the passive UHF omnidirectional container electronic seal.

FIG. 2 illustrates the principle of the passive UHF omnidirectional container electronic seal. When using the passive UHF omnidirectional container electronic seal, the passive UHF omnidirectional container electronic seal is put in a lock hole of the container and then lock it on. When the seal has been locked, it connects with the plug-in unit (23) through the cable plug-in unit (13) of locking bar (1) and the RFID chip (14) in the locking bar (1) connects with the antenna (24) of the locking cap (2), forms a return circuit, reach the working state. While truck passes to the gate of clearing customs and the reader is in valid distance (can reach 10 meters at least), the reader will sense the signal of RFID chip (14) of the electronic container seal by antenna (24) automatically. The data in RFID chip (14) of the electronic container will be received by the writing device and do the properly handling.

When the passive UHF omnidirectional container electronic seal has not been locked, the cable plug-in unit (13) and the plug-in unit (23) are disconnected. Once the RFID chip (14) is sealed in the locking bar (1), that can send and receive from the inside and external electromagnetic wave signal with shielding. This function could ensure the passive UHF omnidirectional container electronic seal will not be read before lock on or other external factors, such as because of the reaction by human.

Figure 3A:
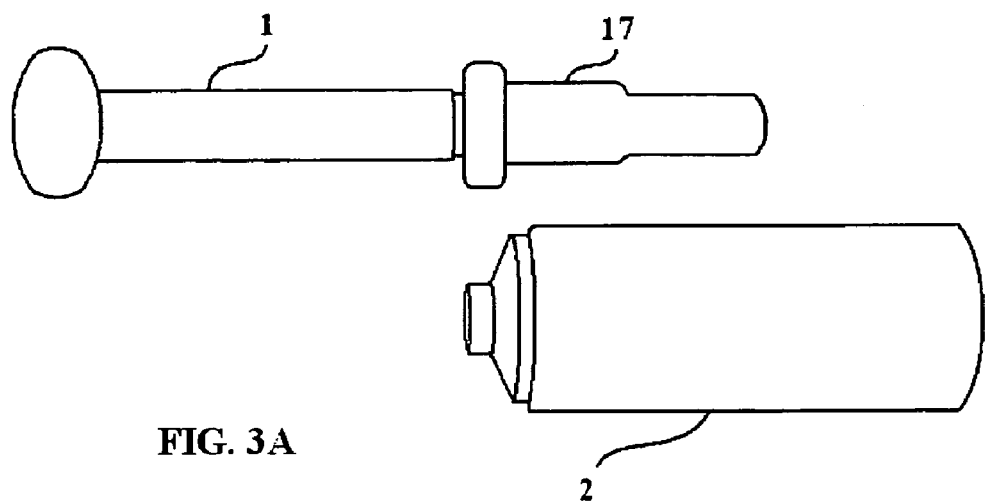
Figure 3B:
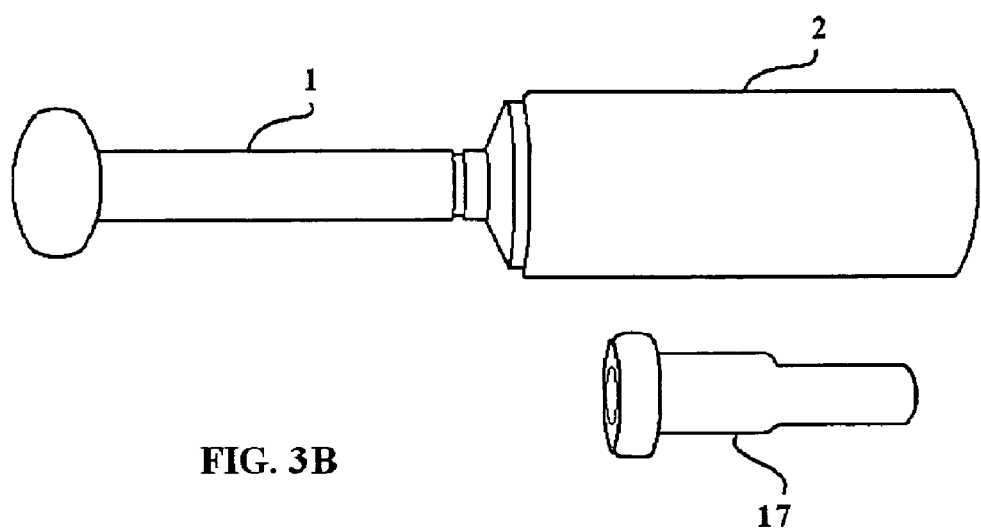

The passive UHF omnidirectional container electronic seal may further comprise a detachable locking bar sheath (17). The locking bar sheath (17) may fabricate by ABS material and its external diameter is greater than the internal diameter of the metal sheath (21) of the locking cap (2). Referring to the FIG. 3, before the passive UHF omnidirectional container electronic seal has been locked, the detachable locking bar sheath (17) is disposed outside the bottom of the metal pipe fitting (11) of the locking bar (1). While locking, the locking bar sheath (17) is taken out from the metal pipe fitting (11) to prevent the user inserts the metal pipe fitting (11) of the locking bar (1) into the metal sheath (21) of the locking cap (1) inadvertently. In addition, it can print the same sequence number in the group of the head of locking bar (12) and the locking bar sheath (17). The locking bar sheath (17) taken out is convenient for user to record.

Figure 4:
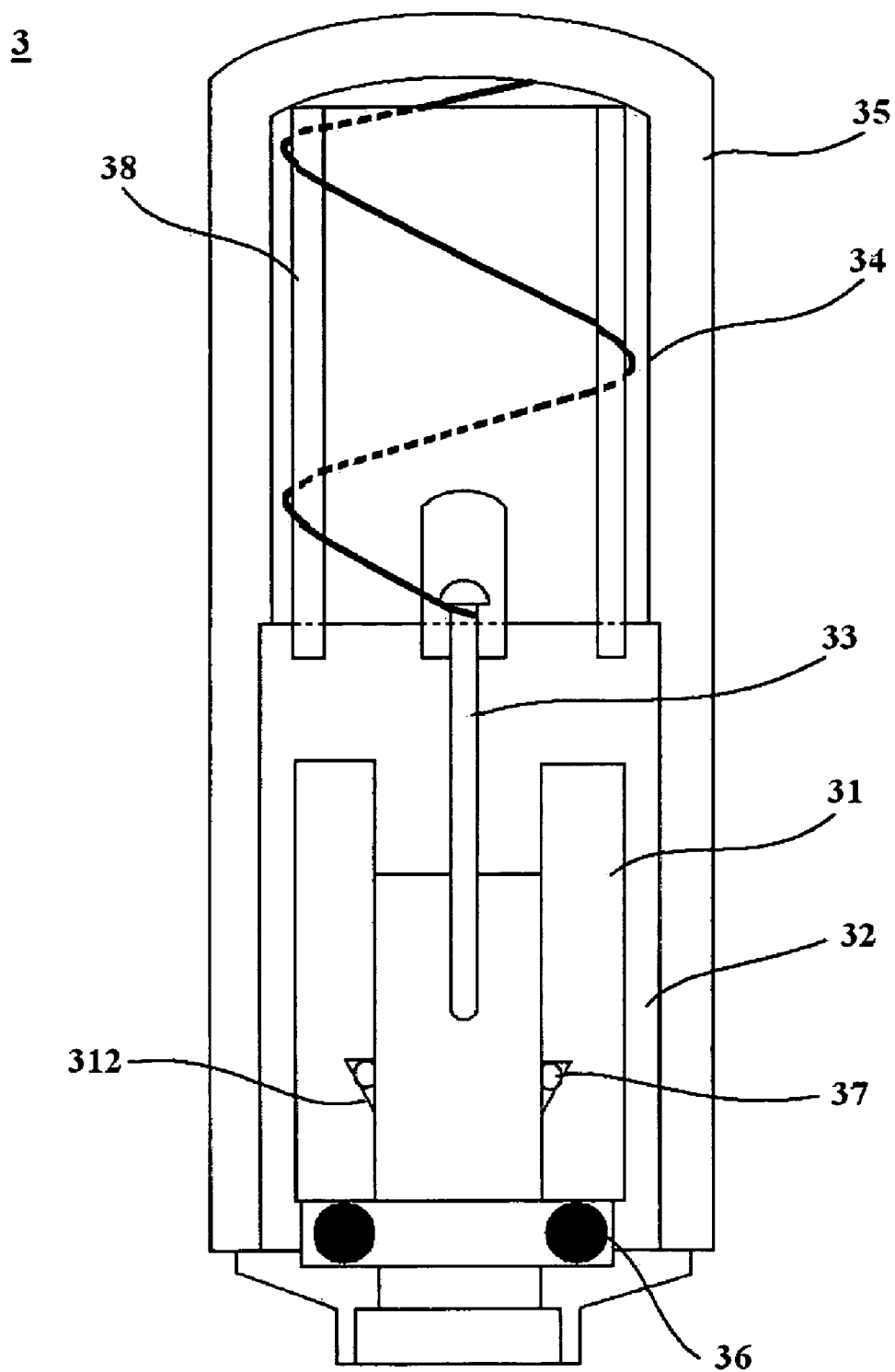
FIG. 4 is a schematic diagram of the passive UHF omnidirectional container electronic seal according to another embodiment of the present invention.

FIG. 4 illustrates a schematic diagram of the locking cap to another embodiment of the present invention. The structure of the locking cap (3) is similar to the locking cap (2), which comprises a metal sheath (31) matched with the metal pipe fitting (11) and a plastic component (32) covered outside of the metal sheath (31). A plug-in unit (33), matched with the cable plug-in unit (13) in the locking bar (1), is inlaid in the bottom of the metal sheath (21). A spiral antenna (34) is soldered in the plug-in unit (33) and stretches out outside of the plastic component (32). A covered antenna cap (35) outside of the plastic component (22) and the plastic is the ABS material. In addition, there is a spring lock (37) in the metal sheath (31) of locking cap (3) and a sealed loop (36) in the plastic component (32) of locking cap (3), the sealed loop (36) may densely seal up the space between the metal pipe fitting (11) of locking bar (1) and the locking cap (3) to prevent water flow into the locking cap (3) and the locking bar (1). A pair of grooves (312) is in the metal sheath (31) of locking cap (3) and the spring lock (37) is in the pair of grooves (312).

The difference between the locking cap (3) and locking cap (2) is that, in the locking cap (3), the part in the top of plastic component (32) outside the covered antenna cap (35) is formed of a dish shape. Compared with the locking cap (2), the locking cap (3) has the better conjugation grade and airtight character between the plastic component (32) and the covered antenna cap (35). The slop design outside the top of the plastic component (32) can prevent the water to accumulate in the junction between the locking bar (1) and the locking cap (3) and between the plastic component (32) and the covered antenna cap (35).

In another embodiment of the present invention, the locking cap (3) further comprises a plastic cylinder (38) between, the plastic component and the covered antenna cap for winding the antenna. The plastic cylinder may form of the rubber or plastic material like PVC. The better is that the surface of plastic cylinder (38) contains a spiral groove for entwining the antenna (34).

Although the invention has been explained in relation to its preferred embodiments, it is to be understood that many other possible modifications and variations can be made without departing from the spirit and scope of the invention as hereinafter claimed.

What is claimed is:

1. A UHF omnidirectional container electronic seal without onboard electronic power source, comprising: a locking bar having a RFID chip and a cable connector, wherein the RFID chip is electrically connected with the cable connector; and a locking cap having a plug-in unit which is matched with the cable connector in the locking bar for connecting an antenna in the locking cap; wherein the antenna in the locking cap is a spiral shape, wherein the seal is applicable to a container enclosure by engaging the enclosure between the locking bar and locking cap.

2. The passive UHF omnidirectional container electronic seal as claimed in claim 1, further comprising an impedance matching device is arranged between the RFID chip and the plug-in unit of cable.

3. The passive UHF omnidirectional container electronic seal as claimed in claim 1, wherein the RFID chip is electrically connected with the cable connector through an electrical cable.

4. The passive UHF omnidirectional container electronic seal as claimed in claim 1, further comprising a sealed loop is placed in the locking cap for sealing the space between the locking bar and the locking cap.

5. The passive UHF omnidirectional container electronic seal as claimed in claim 1, further comprising a detachable locking bar sheath is disposed outside the bottom of a metal pipe fitting of the locking bar.

6. The passive UHF omnidirectional container electronic seal as claimed in claim 2, wherein the locking bar is a metal spatial component, the RFID chip and the cable connector are inlaid in the metal spatial component of the locking bar.

7. The passive UHF omnidirectional container electronic seal as claimed in claim 6, wherein the locking cap also is a metal spatial component matched with the locking bar, the plug-in unit matched with the cable connector in the locking bar is inlaid in the metal spatial component of the locking cap, and the antenna connects to the plug-in unit and stretches out of the locking cap.

8. The passive UHF omnidirectional container electronic seal as claimed in claim 7, further comprising: a pair of grooves outside the metal spatial component of the locking bar; and a spring lock in the metal spatial component of locking cap; when the locking bar inserts into the locking cap, the spring lock is locked in the metal spatial component of locking bar.

9. A passive UHF omnidirectional container electronic seal without onboard electronic power source, comprising: a locking bar containing a metal pipe fitting and a head of locking bar which is located outside of the metal pipe fitting, wherein a cable connector is inlaid in the bottom of the metal pipe fitting, a RFID chip is inlaid in the locking bar, and a cable crosses through the metal pipe fitting to electrically connect with the RFID chip and the cable connector; and a locking cap having a plug-in unit is matched with the cable connector in the locking bar for connecting an antenna in the locking cap; wherein the antenna in the locking cap is a spiral shape, and the seal is applicable to a container enclosure by engaging the enclosure between the locking bar and locking cap.

10. The passive UHF omnidirectional container electronic seal as claimed in claim 9, further comprising an impedance matching device is arranged between the RFID chip and the cable connector.

11. The passive UHF omnidirectional container electronic seal as claimed in claim 10, further comprising a detachable locking bar sheath is disposed on the bottom of the metal pipe fitting of the locking bar.

12. The passive UHF omnidirectional container electronic seal as claimed in claim 9, wherein the head of locking bar may wrap up with a rubber and plastic material and it is out of the metal pipe fitting.

13. The passive UHF omnidirectional container electronic seal as claimed in claim 9, wherein the heading locking bar is located in the top of the metal pipe fitting and its shape is trumpet-shaped cone.

14. The passive UHF omnidirectional container electronic seal as claimed in claim 9, wherein the locking cap including a metal sheath is matched with the metal pipe fitting of the locking bar and a plastic component is covered outside of the metal sheath, and the plug-in unit is matched with the cable connector in the locking bar is inlaid in the metal sheath, and the antenna stretched outside the plastic component.

15. The passive UHF omnidirectional container electronic seal as claimed in claim 14, further comprising a covered antenna cap outside with the plastic component.

16. The passive UHF omnidirectional container electronic seal as claimed in claim 14, further comprising:
a pair of grooves in external bottom of the metal pipe fitting of the locking bar; and
a spring lock in the metal sheath of the locking cap;
when the locking bar inserts into the locking cap, the spring lock can be locked in the pair of grooves in external bottom of the metal pipe fitting of the locking bar.

17. The passive UHF omnidirectional container electronic seal as claimed in claim 15, further comprising a plastic cylinder between the plastic component and the covered antenna cap for winding the antenna.

18. A UHF omnidirectional container electronic seal without onboard electronic power source, comprising: a locking bar having a RFID chip and a cable connector, the RFID chip is electrically connected with the electric cable plug-in unit; and a locking cap having a plug-in unit which is matched with the cable connector in the locking bar for connecting an antenna in the locking cap; wherein the locking bar further comprising an impedance matching device is arranged between the RFID chip and the cable connector, and the seal is applicable to a container enclosure by engaging the enclosure between the locking bar and locking cap.

19. The passive UHF omnidirectional container electronic seal as claimed in claim 18, wherein the antenna in the locking cap is a spiral shape.

20. The passive UHF omnidirectional container electronic seal as claimed in claim 18, further comprising a sealed loop is placed in the locking cap for sealing the space between the locking bar and the locking cap.

* * * * *